United States Patent [19]

Leverty

[11] Patent Number: 4,502,794
[45] Date of Patent: Mar. 5, 1985

[54] THERMOMETER MOUTHPIECE DEVICE

[76] Inventor: Patrick A. Leverty, 806 Mac Beth Cir., Lakeville, Minn. 55044

[21] Appl. No.: 472,966

[22] Filed: Mar. 7, 1983

[51] Int. Cl.$^3$ .............................................. G01K 1/14
[52] U.S. Cl. .................................... 374/194; 374/190; 128/736
[58] Field of Search ............... 374/190, 194, 208, 210, 374/151, 141, 192, 158, 147, 148; 128/736, 136, 200.26, 207.14–207.18, 360, 12

[56] References Cited

U.S. PATENT DOCUMENTS

| | | | |
|---|---|---|---|
| 2,445,539 | 7/1948 | Singer | 128/736 |
| 2,579,376 | 12/1951 | Falk | 374/194 |
| 2,767,704 | 10/1956 | Bailey | 128/2 |
| 2,797,682 | 7/1957 | Kannenberg | 128/2 |
| 3,913,402 | 10/1975 | Doyle | 73/343 R |
| 4,072,054 | 2/1978 | Blouin | 73/343 R |
| 4,197,944 | 4/1980 | Catlin | 206/306 |
| 4,344,428 | 8/1982 | Sherman | 128/207.14 |

Primary Examiner—Charles Frankfort
Assistant Examiner—Patrick Scanlon
Attorney, Agent, or Firm—Anthony G. Eggink

[57] ABSTRACT

The thermometer mouthpiece device is for slidably and releasably engaging a thermometer for oral use. The mouthpiece device is for releasably holding a thermometer at a predetermined location so that the positioning of the device in the mouth of a user results in the proper extension of the thermometer bulb into the mouth cavity. The mouthpiece device is aerodynamic in construction to facilitate breathing by a user, and the device is resilient in composition to engage the teeth or gums of a user and to prevent breakage or fear of breakage of the thermometer. The aerodynamic mouthpiece device is comprised of a unitary, elongated and resilient body member having opposing tapered end portions. A ribbed center portion is circumferentially disposed about the device body intermediate the opposing tapered ends. A thermometer holding and securing means is provided to slidably engage a thermometer. And, a holding means comprised of an axial bore of an equilateral triangular cross section through the device body is provided to engage a plurality of thermometer configurations. Additionally, elongated air passage channels are provided to further facilitate user breathing, and unitary, moldable body members of a sterilizable construction are provided to permit repeated device use.

20 Claims, 5 Drawing Figures

THERMOMETER MOUTHPIECE DEVICE

This invention relates to a mouthpiece device for a thermometer. Particularly, this invention relates to an aerodynamic thermometer mouthpiece for releasably engaging and holding a thermometer for oral use.

Thermometer mouthpiece devices according to the invention are useful for slidably and releasably engaging a clinical thermometer for oral use. The mouthpiece devices permit a user to place a device at a predetermined location along the length of a thermometer so that when placed between the teeth or gums of a user, the thermometer bulb is extended in a desired and optimal location within the oral cavity to record temperature. And, these devices are especially useful for safely engaging the teeth or gums of a user without fear of thermometer breakage or swallowing, while providing means to reduce the breathing obstructions that are usually associated with similar devices.

In the past, several types of thermometer mouthpiece devices have been proposed or utilized. However, these devices have been difficult to use, inherently limited in use, or have been complex in construction, and, thus, costly to manufacture. And, despite the longstanding need for a simple and inexpensive to manufacture and utilize device for a wide range of users, and for the above mentioned purposes, none in so far as is known, has been developed.

For example, several prior art devices teach the combined use of a pacifier and oral thermometer, particularly, for use by infants. These devices, however, are difficult to manufacture, obviously limited in use, provide questionable reading results due to the fixed nature of the thermometer bulb, and they provide flange members which impair the breathing capability of the infant user. Other devices disclose mouthpieces which angularly receive a thermometer, which are designed for a particular teeth-bite configuration, and which inherently impede the ability of a user to breathe. Also, still other devices teach the use of hand held thermometer protectors, which likewise, are not aerodynamic in design, and not versatile to a variety of users, i.e., infant, elderly and physically impaired.

The thermometer mouthpiece devices of this invention overcome the difficulties, limitations, and other shortcomings of these prior art devices. Particularly, the thermometer mouthpiece devices of this invention provide for simple, easy to manufacture, and inexpensive devices that are useable for a variety of users, irrespective of teeth configuration and mouth cavity configuration, and which do not impair the breathing ability of the user because of the aerodynamic characteristics of the devices.

In summary, this invention provides an aerodynamic mouthpiece device for use with an oral thermometer. The mouthpiece device is for slidably and frictionally engaging the thermometer so that the device can be positioned on the thermometer depending upon the mouth cavity configuration of the user. The mouthpiece consists of a resilient, tapered body having at least one air passage way disposed along its length. The tapered end construction and the air passage provide for the ability of a user to breathe with minimal impairment while the device is in use. A ribbed center portion of the device body provides for teeth gripping by the user to effectively hold the thermometer in the mouth cavity without fear of breakage. Additionally provided is thermometer gripping means generally consisting of an elongated bore in the device body for slidably securing a thermometer. The latter permits a user to properly adjust the bulb end of the thermometer with respect to its length extension from one of the body ends, so that the bulb is properly extended under the tongue of a user as the mouthpiece is gripped between the user's teeth. Additionally provided is a longitudinally extending device body bore having a generally triangular cross section to permit secure gripping with the typical oral thermometer and, which, also provides optimal slidability characteristics of the device.

Additionally provided by the invention are thermometer mouthpiece devices having a number of body configurations to effectuate the aerodynamic requirement of the device body; and, provided are circumferentially disposed teeth gripping surfaces which permit the engagement with a variety of user upper and lower teeth alignments.

These and other benefits of this invention will become clear from the following description, by reference to the drawings, wherein.

Figure 1:
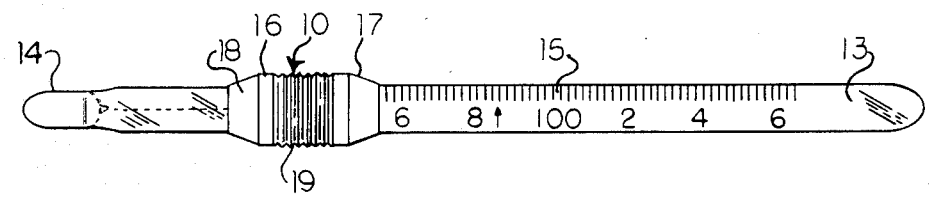
FIG. 1 is a schematic, perspective view of the thermometer mouthpiece device of the invention, and shown engaging a clinical thermometer.

Referring to FIG. 1, a thermometer mouthpiece device 10 is illustrated releasably, and frictionally engaged with a typical clinical thermometer 13, which is used to measure the body temperature of a user. The thermometer 13 has a bulb end or reservoir 14, which contains a heat expandable fluid, such as mercury, and which has temperature gradations 15, which commonly range from 92 to 106 degrees on the Fahrenheit scale.

The thermometer mouthpiece device 10 is shown as having a generally elongated body member 16 and opposing tapered end portions 17 and 18. Although this embodiment illustrates a body member 16 having symmetrical front and rear tapered end portions 17 and 18, this symmetry is not a requirement, as another embodiment will illustrate below.

The thermometer mouthpiece device 10 has a circumferentially disposed ribbed or ridged center portion 19 between the end portions 17 and 18 of body member 16. The ribbed center portion 19 is for receiving the upper and lower teeth or gums of a user so that the device 10 is held in a relative stationary position in the mouth of a user. The device body 16 is preferably constructed of a unitary, resilient and deformable material, such as rubber, rubber compounds, or of soft thermoplastic compositions. Additionally, materials which are readily moldable, for injection molding purposes, for example, are preferred. And, the materials utilized to construct device body members 16 are preferably temperature and chemically stable for cleaning purposes. For example, the mouthpiece device 10 is medically cleanable, i.e., non-disolvable in alcohols, temperature stable for sterilization purposes, and physically constructed to withstand scrubbing.

Figure 2:
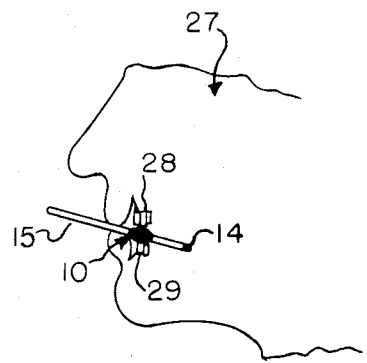
FIG. 2 is a schematic, lateral plan view of a thermometer mouthpiece device of the invention placed about a clinical thermometer and held in the mouth cavity of a user.

The thermometer mouthpiece device 10 is frictionally slidable on thermometer 13, so that it can be positioned with respect to the thermometer in such a manner that a predetermined distance of the bulb or reservoir end 14 of the thermometer 13 extends outward from the device body end 18, as shown in FIG. 1. The proper extension distance is such, so that, as shown in FIG. 2, a user 27 having the mouthpiece device 10 gripped by upper and lower teeth 28 and 29, respectively, is able to receive the thermometer bulb end 14 comfortably beneath the tongue, as is clinically preferable to obtain reliable body temperature readings.

Figure 3:
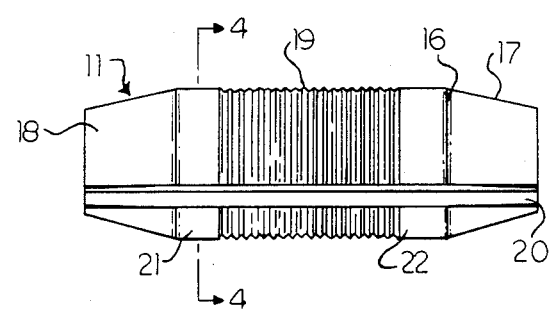
FIG. 3 is a schematic lateral view of one embodiment of the thermometer mouthpiece according to the teachings of this invention.
Figure 4:
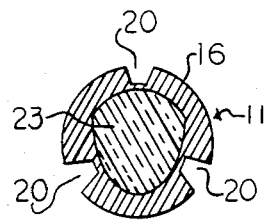
FIG. 4 is a cross sectional view of the thermometer mouthpiece device taken on line 4—4 of FIG. 3; and, FIG. 5 is a schematic, lateral view of another embodiment of the thermometer mouthpiece device of this invention, and shown engaging a clinical thermometer for oral use.

FIG. 3 illustrates a mouthpiece device embodiment 11, which has a device body 16 having tapered end portions 17 and 18, shoulder portions 21 and 22, and a ribbed center portion 19, all of which being similar to the elements of the embodiment 10, as shown in FIG. 1. However, in addition thereto, is an elongated air passage channel 20 which extends along the surface of body member 16. The air passage channel or air passage way 20 is to further aid in maximizing the ability of a user to breathe when the mouthpiece device 11 is placed within the mouth cavity of a user. Particularly, this embodiment, as shown cross sectionally in FIG. 4, provides three such air passage ways 20 so that a user always has an effective and usable air passage way 20 as the teeth or gums are brought in contact with the device body member 16.

As shown in the various drawings, the ribbed or ridged center portions 19 are particularly disposed to receive the upper and lower teeth of a user, in that the respective teeth can be fixedly placed in any of the valleys of the plurality of ribs 19. The ribbed portion 19 is preferably an elongated portion so that a range of user upper and lower teeth alignments can be properly accomodated. For example, to accomodate or receive overbite or underbite teeth or gum alignments. Additionally, it is preferable that the valleys between the individual ribs or ridges of portion 19 be rounded or contoured at the bottom or apex to effectuate the ability of proper device cleaning and to prevent or minimize the possibility of debris or germs to lodge therein.

Figure 5:
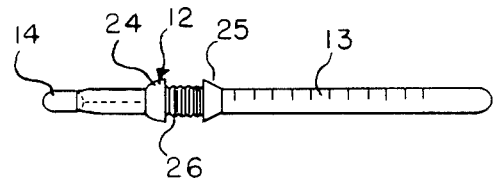

In FIG. 5 of the drawings, thermometer mouthpiece device embodiment 12 is illustrated. Mouthpiece device 12 is shown as having a tapered frontal portion 25, a ribbed, indented center teeth gripping portion 26, and a rounded, tapered back or rear portion 24. This device configuration is particularly aerodynamic in structure because of the tapered frontal portion 25 which directs the air flow about the remaining portions of the device, and which air flow terminates about the roundly configured rear portion 26. Additionally, the indented center portion 26 provides for added teeth or gum securement means to prevent the slippage or movement of the device body with respect to the teeth or gums of a user.

The respective mouthpiece embodiments have thermometer securing means for slidably and frictionally engaging the outer periphery of a thermometer. The securement means is comprised of an elongated bore or aperture which extends generally axially through the device body members. Preferably, the elongated bore or aperture 23 is comprised of an interior cross sectional configuration to effectively frictionally engage a thermometer having a predetermined outside diameter or cross sectional configuration. The preferred aperture configuration, as shown in FIG. 4, is a generally triangularly disposed cross sectional configuration 23, which defines three elongated resilient planes along the length of the aperture to frictionally engage and secure a thermometer.

Clinical thermometers designed for oral use are provided in the marketplace having a variety of cross sectional configurations. Generally, circular and triangular designs are most common. The cross sectional configuration 23 of device body member 16 is usable on generally most of these thermometer configurations. For example, in use with a thermometer of triangular cross section, this device is held frictionally by all of its interiorly extending surfaces, whereas, in use with a thermometer having a circular cross section, the three sides of the triangular surfaces of the resilient and flexible device body provide pressure points to hold the thermometer. And, the mouthpiece devices of this invention are also designed for use on the probes which extend from the increasingly popular electronic thermometer devices. Of course, the elongated aperture dimension of the mouthpiece device would correspond in configuration and size with the external design and dimensions of the probe with which the mouthpiece device is to be utilized.

The thermometer mouthpiece devices of this invention are particularly useful for children or other individuals that may be physically or mentally predisposed to biting or swallowing a thermometer. However, the device is suitable for use by any user in that it permits the proper extension of the thermometer therefrom for proper placement in the user's mouth cavity. The aerodynamic configuration of the device is particularly useful so that the device does little to impede the breathing ability of a user. And, often this is important because at the times of requiring the taking of the body temperature, the individual has a cold or other respiratory difficulty which makes breathing burdensome. Of course, the desirability of an aerodynamic mouthpiece device is readily apparent when one places an object, such as a finger, between ones teeth and then continues to breathe.

The aerodynamic configurations of the several embodiments of this invention provide for an effective and easily mountable mouthpiece device without significantly impairing the breathing ability of a user. The several embodiments provide unitary, resilient, elongated body members having tapered end portions. The tapered end portions, and the air passage way channels provide for the flow of air about the device body members. The tapered end portions can be of the configuration as shown in FIG. 3 or that of FIG. 5. And, it is within the purview of the invention to utilize mouthpiece devices having any combination of these tapered configurations, i.e., whether rounded or inclined. Obviously, embodiments having a symmetrical body design eliminate the need of user discrimination as to the proper placement of the device on a thermometer. The addition of air passage way channels, which are indented, elongated slots into the exterior surface of the device body, increase the aerodynamic nature of the mouthpiece devices. And, although three such channels are illustrated in the embodiment of FIG. 4, the number may vary and is restricted by the structural integrity of the device body composition.

The mouthpiece devices of this invention provide devices which are easily placed on a thermometer, which are quickly adjustable for proper use, and which are easily removed. And, the devices are such, that they are beneficial and usable by a variety of users without effecting the accuracy of the thermometer with which it is utilized.

As many changes are possible to the embodiments of this invention, utilizing the teachings thereof, the descriptions above, and the accompanying drawings, should be interpreted in the illustrative, and not in the limited sense.

That which is claimed is:

1. An aerodynamic thermometer mouthpiece device for releasably holding a thermometer and for engaging the teeth of a user, said device comprising a unitary, elongated body portion having tapered front and rear portions, said elongated body portion being of a resilient construction and having a circumferentially disposed ribbed center portion for engaging the teeth of a user, said elongated body portion further having a thermometer holding and securing means extending therethrough for receiving and frictionally engaging the exterior surfaces of a thermometer, said body portion further having three elongated air passage channels equidistantly disposed from the front to the rear portions along its outer periphery, whereby, subsequent to positioning said aerodynamic thermometer mouthpiece about a thermometer at a predetermined location along its length, a user is able to engage said ribbed center portion between the upper and lower teeth to thereby protect the thermometer from breakage, to properly position the thermometer within the mouth cavity, and to minimize breathing impairment due to its tapered, aerodynamic, elongated body construction.

2. The aerodynamic thermometer mouthpiece device of claim 1, wherein said thermometer holding and securing means is comprised of a longitudinally extending aperture in said elongated body portion, said aperture being generally axially aligned and extending from said front to said rear portion of said elongated body portion.

3. The aerodynamic thermometer mouthpiece device of claim 2, wherein said longitudinally extending aperture has a generally triangular cross section, said triangular cross section providing elongated resilient planes along the length of said aperture to frictionally engage and secure a thermometer.

4. The aerodynamic thermometer mouthpiece device of claim 1, wherein said ribbed center portion is at least partially recessed in said elongated body portion, said recessed center portion being for providing upper and lower teeth or gum placement locations for a user of said mouthpiece device.

5. The aerodynamic thermometer mouthpiece device of claim 1, wherein said tapered front and rear portions of said elongated body portion are of a rounded configuration.

6. The aerodynamic thermometer mouthpiece device of claim 1, wherein said device is constructed of a unitary, molded material which is adaptable for sterilization.

7. The aerodynamic thermometer mouthpiece device of claim 6, wherein said device is molded of a thermoplastic material.

8. The aerodynamic thermometer mouthpiece device of claim 6, wherein said device is molded of a rubber compound.

9. An aerodynamic thermometer mouthpiece device for slidably and releasably holding an oral thermometer, said mouthpiece device for frictionally engaging and securing a thermometer at a predetermined position so that the bulb portion of a thermometer is extended therefrom to reach under the tongue of a user as said device is held by the teeth or gums of a user, said mouthpiece device comprising:
(a) a unitary, resilient and elongated body portion having opposing tapered end portions, said body portion further having a circumferentially disposed gripping portion at a position intermediate said tapered end portions for engaging the teeth or gums of a user,
(b) thermometer securing means for slidably and frictionally engaging the outer periphery of a thermometer, said securing means being an elongated, axially aligned bore disposed through said elongated body portion from its one tapered end portion to its opposite tapered end portion, and
(c) at least one elongated air passage channel disposed along the length of said unitary, elongated body portion, said air passage channel further being indented into the periphery of the elongated body portion and being generally spacially aligned with said axially aligned bore, whereby with a thermometer secured in the device and placed in the mouth cavity of a user the air passage channel is aligned to facilitate the breathing ability of the user.

10. The aerodynamic thermometer mouthpiece device of claim 9, wherein said axially aligned bore through said elongated body portion is of a generally triangular cross section, whereby three elongated resilient planes are provided to frictionally engage a plurality of oral thermometer configurations.

11. The aerodynamic thermometer mouthpiece device of claim 9, wherein said unitary, elongated and resilient body portion is constructed of an injection moldable material which is sterilizable for repeated use.

12. The aerodynamic thermometer mouthpiece device of claim 11, wherein said device is molded of material selected from a group consisting of thermoplastic and rubber compounds.

13. The aerodynamic thermometer mouthpiece device of claim 9, wherein said elongated body portion has three elongated air passage channels disposed along its outer periphery, said three air passage channels being equidistantly disposed about the periphery of said elongated body portion and being extended from the front to the rear portions thereof.

14. The aerodynamic thermometer mouthpiece of claim 9, wherein said circumferentially disposed gripping portion is at least partially recessed to further provide upper and lower teeth or gum placement locations to further secure the device in the mouth of a user.

15. The aerodynamic thermometer mouthpiece device of claim 9, wherein said opposing tapered portions of said elongated body portion are of a rounded configuration.

16. An aerodynamic thermometer mouthpiece device for slidably and releasably holding an oral thermometer, said mouthpiece device for frictionally engaging and securing a thermometer at a predetermined position so that the bulb portion of a thermometer is extended therefrom to reach under the tongue of a user as said device is held by the teeth or gums of a user, said mouthpiece device comprising:
(a) a unitary, resilient and elongated body portion having opposing tapered end portions, said body portion further having a circumferentially disposed gripping portion at a position intermediate said tapered end portions for engaging the teeth or gums of a user, (b) thermometer securing means for slidably and frictionally engaging the outer periphery of a thermometer, said securing means being an elongated, axially aligned bore disposed through said elongated body portion from its one tapered end portion to its opposite tapered end portion, and (c) a plurality of generally parallel elongated air passage channels equidistantly disposed along the exterior length of said elongated body portion, said air passage channels further being disposed generally spacially parallel to the axially aligned bore of said elongated body portion to facilitate the breathing ability of a user.

17. The aerodynamic thermometer mouthpiece of claim 16, wherein said circumferentially disposed gripping portion is at least partially recessed to further provide upper and lower teeth or gum placement locations to further secure the device in the mouth of a user.

18. The aerodynamic thermometer mouthpiece device of claim 16, wherein said opposing tapered portions of said elongated body portion are of a rounded configuration.

19. The aerodynamic thermometer mouthpiece device of claim 16, wherein said unitary, elongated and resilient body portion is constructed of a molded material which is sterilizable for repeated use, said material further being selected from the group of materials consisting of thermoplastic and rubber compounds.

20. The aerodynamic thermometer mouthpiece device of claim 16, wherein said axially aligned bore through said elongated body portion is of a generally triangular cross section, whereby three elongated resilient planes are provided to frictionally engage a plurality of oral thermometer configurations.

* * * * *